United States Patent
Naoi et al.

(10) Patent No.: US 9,843,037 B2
(45) Date of Patent: Dec. 12, 2017

(54) ELECTRODE MATERIAL AND MANUFACTURING METHOD THEREOF

(71) Applicant: NIPPON CHEMI-CON CORPORATION, Shinagawa-ku, Tokyo (JP)

(72) Inventors: Katsuhiko Naoi, Tokyo (JP); Wako Naoi, Tokyo (JP); Yoshihiro Minato, Tokyo (JP); Satoshi Kubota, Tokyo (JP); Syuichi Ishimoto, Tokyo (JP); Kenji Tamamitsu, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 244 days.

(21) Appl. No.: 14/670,842

(22) Filed: Mar. 27, 2015

(65) Prior Publication Data

US 2015/0207144 A1 Jul. 23, 2015

Related U.S. Application Data

(63) Continuation of application No. PCT/JP2013/076595, filed on Sep. 30, 2013.

(30) Foreign Application Priority Data

Sep. 28, 2012 (JP) ................... 2012-218450

(51) Int. Cl.
*H01M 4/36* (2006.01)
*H01G 11/32* (2013.01)
*H01G 11/38* (2013.01)
*H01G 11/86* (2013.01)
*H01M 4/136* (2010.01)
*H01M 4/1397* (2010.01)
*H01M 4/58* (2010.01)
*H01M 4/62* (2006.01)
*H01M 4/04* (2006.01)
*B82Y 30/00* (2011.01)
*H01M 10/0525* (2010.01)

(52) U.S. Cl.
CPC ............ *H01M 4/366* (2013.01); *H01G 11/32* (2013.01); *H01G 11/38* (2013.01); *H01G 11/86* (2013.01); *H01M 4/0471* (2013.01); *H01M 4/136* (2013.01); *H01M 4/1397* (2013.01); *H01M 4/5825* (2013.01); *H01M 4/625* (2013.01); *B82Y 30/00* (2013.01); *H01M 10/0525* (2013.01); *Y02E 60/13* (2013.01); *Y02T 10/7022* (2013.01)

(58) Field of Classification Search
CPC ...... H01M 4/04; H01M 4/0471; H01M 4/366; H01M 4/5825; H01M 4/625; H01M 4/136; H01M 4/1397; H01G 11/32; H01G 11/38; H01G 11/86
See application file for complete search history.

(56) References Cited

U.S. PATENT DOCUMENTS

| | | | |
|---|---|---|---|
| 9,287,553 B2 | 3/2016 | Naoi et al. | |
| 2002/0182497 A1 | 12/2002 | Kohzaki et al. | |
| 2004/0131919 A1* | 7/2004 | Yasumoto | H01M 4/8605 429/490 |
| 2004/0265676 A1* | 12/2004 | Takagi | H01B 1/122 429/483 |
| 2009/0027827 A1* | 1/2009 | Siggel | H01G 9/038 361/502 |
| 2010/0025627 A1 | 2/2010 | Naoi et al. | |
| 2013/0095384 A1 | 4/2013 | Naoi et al. | |
| 2014/0209833 A1 | 7/2014 | Naoi et al. | |
| 2014/0363568 A1* | 12/2014 | Suematsu | H01G 11/50 427/123 |
| 2016/0172124 A1 | 6/2016 | Naoi et al. | |

FOREIGN PATENT DOCUMENTS

| | | | |
|---|---|---|---|
| CN | 102569796 A | * | 7/2012 |
| JP | 2003-034534 A | | 2/2003 |
| JP | 2006-085925 A | | 3/2006 |
| JP | 2007-160151 A | | 6/2007 |
| JP | 2010-108889 A | | 5/2010 |
| JP | 2010-186682 A | | 8/2010 |
| JP | 2011-251889 A | | 12/2011 |

(Continued)

OTHER PUBLICATIONS

Machine translation of CN 102569796A, published on Jul. 11, 2012.*
Machine traslation of JP 2010-186682, published on Aug. 26, 2010.*
Machine translation of JP 2010-108889A, published on May 13, 2010.*
International Search Report from International Patent Application No. PCT/JP2013/076595, dated Dec. 3, 2013.
Office Action dated Oct. 18, 2016, in Chinese Patent Application No. 201380042436.0.

(Continued)

*Primary Examiner* — Anca Eoff
(74) *Attorney, Agent, or Firm* — Shapiro, Gabor and Rosenberger, PLLC

(57) ABSTRACT

A method for manufacturing composites in which the nano-size of a carbon material and a metal compound can be maintained as the final product is realized to provide a superior electrode material. A treatment of increasing the functional groups possessed by a carbon material is performed in advance. Then, a metal compound precursor is supported on a carbon material by separately performing a treatment of adsorbing one of source materials of the metal compound to the functional groups of the carbon material having increased functional groups and a treatment of reacting the adsorbed source material of the metal compound with the rest of the source materials on the carbon material to produce a metal compound precursor on the carbon material. Finally, a lithium source is introduced and calcined.

8 Claims, 8 Drawing Sheets

(56) References Cited

FOREIGN PATENT DOCUMENTS

| WO | WO 2011/122047 A1 | 10/2011 |
| WO | WO 2012/086976 A2 | 6/2012 |
| WO | WO 2013/062129 | * 5/2013 |

OTHER PUBLICATIONS

Office Action dated Mar. 21, 2017, in Japanese Patent Application No. 2012-128450.
Office Action dated Aug. 22, 2017 in Chinese Patent Application No. 201380042436.0.

* cited by examiner

ELECTRODE MATERIAL AND MANUFACTURING METHOD THEREOF

CROSS-REFERENCE TO RELATED APPLICATIONS

This application is a Continuation of PCT Application No. PCT/JP2013/076595, filed on Sep. 30, 2013, and claims priority to Japanese Patent Application No. 2012-218450, filed on Sep. 28, 2012, the entire contents of both of which are incorporated herein by reference.

TECHNICAL FIELD

The present invention relates to an electrode material that can be employed as an electrode material for a secondary battery or a capacitor and that is a composite of a metal compound and a carbon material that is employed as a conductive additive, as well as a manufacturing method thereof.

BACKGROUND ART

Development of secondary batteries has been ongoing in recent years due to rapid spread of digital cameras or smart phones or portable PCs, rising fuel price or increasing consciousness towards environmental burdens, and further, expectations for application to automotive power or electric storage for smart grids.

Used as electrodes for secondary batteries are a positive electrode having a positive electrode material comprising lithium ions and a conductive additive respectively adhered to the surface of a metal foil, and a negative electrode having a negative electrode material that allows adsorption/desorption of lithium ions and a conductive additive respectively adhered to the surface of a metal foil. This lithium battery has advantages such as high working voltage, high energy density, light weight, and long life expectancy, and active development has been continued as the best selection.

A composite having a metal compound that can absorb and desorb lithium supported on a carbon material that is employed as a conductive additive is often employed as an electrode material comprising lithium ions. Examples of a metal compound include lithium cobaltate, lithium iron phosphate, lithium titanate, and lithium manganese phosphate.

Here, development of electric vehicles (EV) or hybrid electric vehicles (HEV) where a part of its drive is assisted with an electric motor has been radically promoted at each automobile manufacturer, and a secondary battery having large capacitance and high input and output is desired as the power source thereof in these automotive applications.

In order to achieve large capacitance and high input and output when employing as the electrode, a composite having a metal compound that can absorb and desorb lithium supported on a carbon material that is employed as a conductive additive, nanosizing of the metal compound and the carbon material that configure the composite can be pointed out as one means therefor.

Accordingly, various methods for nanosizing a metal compound and a carbon material are currently being proposed. A representative method has a problem that in the manufacturing steps of a composite, even if nanosizing of a metal compound and a carbon material is successful during manufacture, aggregation of the metal compound and the carbon material occurs before completing composition of the metal compound and the carbon material, and thus secondary particles of the metal compound and the carbon material will finally be large.

In order to solve this problem, a technology targeting to simultaneously cause the nanosizing of a carbon material, the production of a metal compound precursor excluding lithium, the nanosizing of the metal compound precursor, and the adsorption of the metal compound precursor to the carbon material has been proposed (see e.g. Patent Document 1).

In this technology, each source material of the carbon material and the metal compound precursor are mixed in a container, the carbon material is dispersed by utilizing shear stress and centrifugal force by the rotation of the container, and at the same time, the metal compound precursor is produced by mechanochemical reaction, thereby carrying out dispersion of the produced metal compound precursor while adsorbing the metal compound precursor to the carbon material by mechanochemical reaction.

Moreover, functional groups such as carboxyl or hydroxyl groups present at the surface of the carbon material are electrochemically unstable, and thus the presence of such functional group to which a metal compound is not adsorbed may reduce the charge and discharge rates of the secondary battery and inhibit high input and output of the secondary battery. Accordingly, measures for decreasing the number of functional groups to which a metal compound is not adsorbed are taken, for example, coating is made on the carbon material or the functional group is chemically modified (see e.g. Patent Document 2).

RELATED TECHNICAL PATENT DOCUMENTS

[Patent Document 1] JP2007-160151 A
[Patent Document 2] JP2006-85925 A

However, satisfactory nanosizing of the carbon material and the metal compound has not been achieved even with the method of Patent Document 1. As shown in FIG. 7, even when targeting to simultaneously cause the nanosizing of a carbon material (KB), the production of a metal compound precursor (ternary complex), the nanosizing of the metal compound precursor, and the adsorption of the metal compound precursor to the carbon material, more than a little aggregation of the metal compound precursor is caused before adsorption, and relatively large sized metal compound precursors will be adsorbed to the carbon material.

Moreover, as shown in FIG. 8, large sized metal compound precursors adsorbed to functional groups at one place act as a physical obstacle, thereby preventing the adsorption of other metal compound precursors to functional groups in vicinity thereof. In such a case, the metal compound precursors having nowhere to go aggregate with other metal compound precursors, and their size become even larger.

Further, since large sized metal compound precursors are present in the vicinity of the adsorbed functional group, many functional groups that could not adsorb a metal compound precursor will be produced. It can be said that the method of Patent Document 2 is a measure for hiding the presence of such functional groups.

As described, there are only a few examples that can maintain the nanosize of the carbon material and the metal compound as the final product by conventional methods, and a satisfactory secondary battery having high capacitance and high input and output could not be obtained by applying a composite therefrom as an electrode.

Accordingly, the object of the present invention is to realize a method for manufacturing these composites in which the nanosize of a carbon material and a metal compound can be maintained as the final product to provide a superior electrode material.

SUMMARY OF THE INVENTION

A method for manufacturing an electrode material that achieves the above objective is a method for manufacturing an electrode material by compositing a metal compound and a carbon material, the electrode material is manufactured by the following steps respectively performed separately.
(First Step)
Step of increasing functional groups possessed by the carbon material,
(Second Step)
Step of adsorbing one of source materials of the metal compound to the functional groups of the carbon material having increased the functional groups,
(Third Step)
Step of reacting the adsorbed source material of the metal compound with other source materials of the metal compound on the carbon material to produce a metal compound precursor on the carbon material, and
(Fourth Step)
Step of calcining a product obtained in the third treatment.

In the first step of increasing functional groups, the carbon material may be acid-treated. In addition, heat treatment may be applied to the carbon material.

The second and third steps may be treatments allowing mechanochemical reaction by applying shear stress and centrifugal force respectively to a solution comprising the carbon material and the source materials of the metal compound inside a rotating reaction container. This is a so-called UC treatment. Moreover, in the second step, a total of one adsorption treatment may be performed by ultrasonic wave treatment before the UC treatment.

By this manufacturing method, an electrode material that is a composite of a metal compound and a carbon material can be observed as being composed of the metal compound supported on the carbon material, a number of functional groups of the carbon material is increased to 130 to 250%, a particle size of the carbon material is 30 to 50 nm, and a particle size of the metal compound is 60 to 80 nm.

According to the present invention, the nanosize of the carbon material and the metal compound is maintained until the end, and large capacitance and high input and output can be realized.

DESCRIPTION OF EMBODIMENTS

(1) Electrode Material

The electrode material according to the present invention is a composite in which a metal compound that can absorb and desorb lithium (Li) is supported on a carbon material that is employed as a conductive additive, wherein both consistently maintain nanoparticles in the manufacturing steps. Nanoparticles refer to secondary particles and are aggregates of primary particles. Nanoparticles refer to those wherein the diameter of the aggregates thereof has a maximum diameter of less than 100 nm in cases of round or elliptical or polygonal shape masses, and a fiber diameter of less than 100 nm in the case of fibers.

This composite is obtained as a powder, and is made into an electrode for storing electrical energy by mixing the composite powder with a binder and molding. This electrode can be employed for an electrochemical capacitor or a battery that employs an electrolytic solution containing lithium. In other words, an electrode fabricated by this electrode material for secondary battery can absorb and desorb lithium ions, and acts as negative or positive electrode.

As the carbon material, any one carbon nanotubes having a fibrous structure, Ketjen Black that is carbon black having a hollow shell structure, carbon black such as acetylene black, amorphous carbon, carbon fiber, natural graphite, artificial graphite, activated carbon, and mesoporous carbon, or a mixture of plural of them can be used. The carbon nanotubes may be either single-wall carbon nanotubes (SW-CNT) or multi-wall carbon nanotubes (MWCNT).

This carbon material is subjected to an acid treatment in advance before compositing with the metal compound. This is to increase the number of functional groups present at the surface of the carbon material. This is thought to increase the opportunity for the nanosized metal compound precursors to be adsorbed to the carbon material, thereby enabling prevention of aggregation of metal compound precursors due to lack of adsorption positions or competing for adsorption positions and the like.

The metal compound is an oxide or an oxysalt comprising lithium, and is represented by $Li_\alpha M_\beta Y_\gamma$. In the case of a metal oxide, e.g., M is any of Co, Ni, Mn, Ti, Si, Sn, Al, Zn, and Mg, and Y is O. In the case of a metal oxysalt, e.g., M is any of Fe, Mn, V. Co, and Ni, and Y is any of $PO_4$, $SiO_4$, $BO_3$, and $P_2O_7$. $M_\beta$ may be an $M_\delta M'_\epsilon$ alloy, and e.g. M is any of Sn, Sb, and Si, and M' is any of Fe, Co, Mn, V, Ti, and Ni. This metal compound is produced by producing a metal compound precursor that is $M_\beta Y_\gamma$ before containing lithium, as well as mixing the precursor with lithium, and then calcining.

(2) Manufacturing Method

Figure 1:
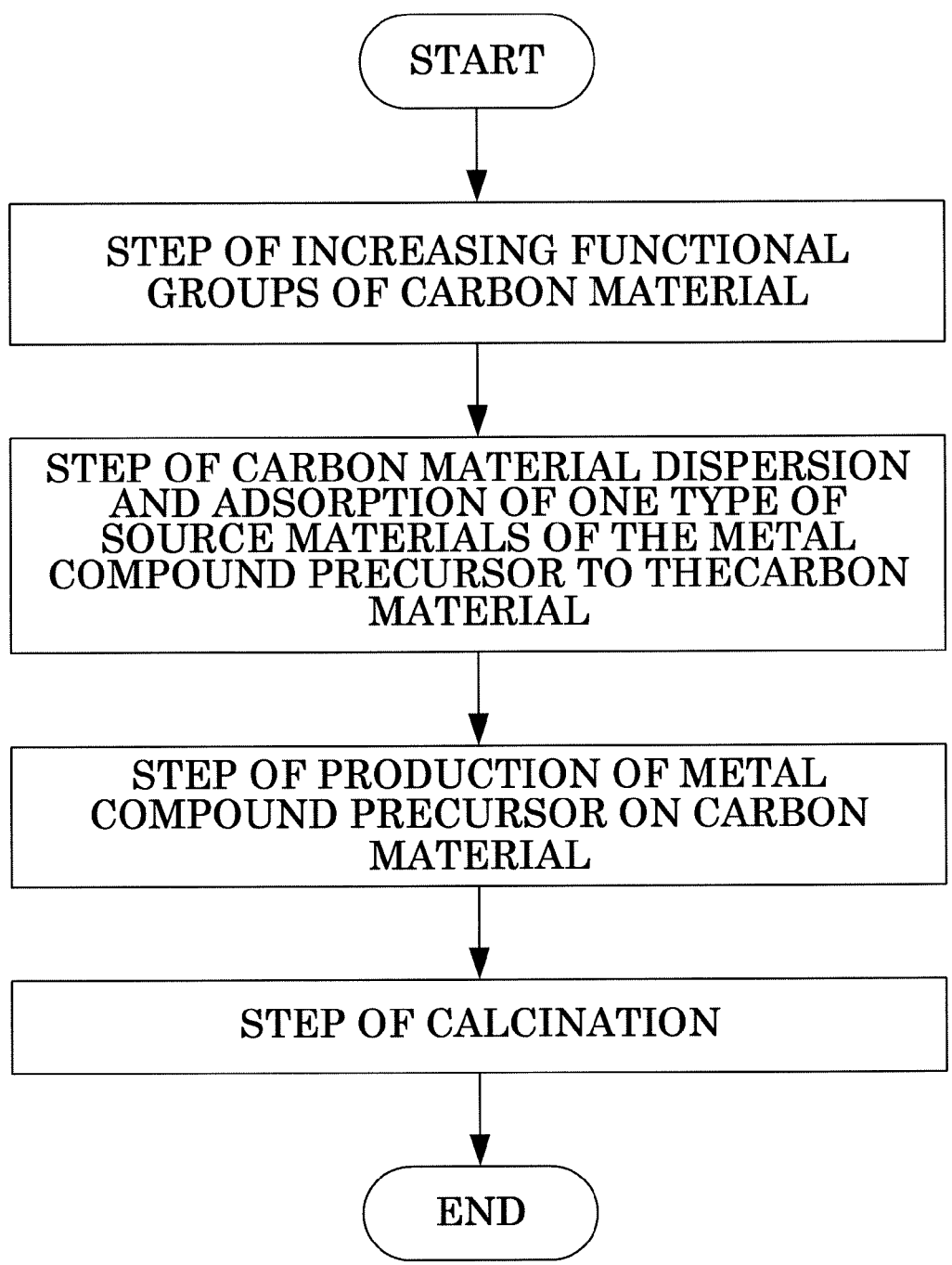
FIG. 1 is a flow chart that shows the manufacturing steps of a composite of a metal compound and a carbon material according to the present embodiment.

One example of the manufacturing steps of a composite of a metal compound and a carbon material is shown in FIG. 1. As shown in FIG. 1, firstly, the carbon material is subjected to a treatment in advance to increase functional groups (step of increasing functional groups). Then, secondly, the carbon material after the treatment to increase functional groups is nanosized, while one of the source materials of the metal compound precursor is adsorbed to the functional groups of the carbon material (dispersion/adsorption step) The metal compound precursor is $M_\beta Y_\gamma$ before containing lithium. Next, the metal compound precursor is produced on the carbon material with the source material adsorbed to the carbon material as the base point (precursor production step) Finally, a metal compound containing lithium is produced by calcination (calcination step).

In other words, in the manufacturing steps of composite of a metal compound and a carbon material according to the present invention, the carbon material is acid-treated in advance of producing the metal compound precursor, for the purpose of adsorbing one of the source materials of the metal compound precursor to the carbon material and then producing the metal compound precursor with the source material of the metal compound precursor adsorbed on the carbon material as the base point.

(a) Step of Increasing Functional Groups

The step of increasing functional groups is a treatment of increasing the functional groups present at the surface of the carbon material, and includes acid treatment or heat treatment and the like. The functional group is a carboxylic or a hydroxyl group, and an oxygen ion having an unpaired electron is present. This functional group will be the adsorption position of one source material of the metal compound precursor. For acid-treating the carbon material, various kinds such as sulfuric acid, acetic acid, nitric acid, hydrogen peroxide, hydrochloric acid or potassium permanganate can be employed as the acid.

Note, however, that acid treatment time is preferably about 5 minutes to 3 hours. This is because when it is less than 5 minutes, functional groups cannot be sufficiently increased, competition for adsorption position of the source material trying to adsorb to the carbon material will occur, and aggregation will be produced. On the other hand, when it is over 3 hours, there will be an excess of functional groups against the source material to which they are trying to adsorb, and electrochemically unstable functional groups with no source material of the metal compound precursor adsorbed thereon will be increased.

Moreover, the percentage of increase of functional groups is desirably 130 to 250%, preferably about 150%. When the percentage of increase of functional groups is less than 130%, the capacitance or the output property of a battery that employs a battery material consisting of a composite of a metal compound and a carbon material supported thereon will be reduced.

(b) Dispersion/Adsorption Step

A mixed solution is prepared by mixing the acid-treated carbon material and the source material of the metal compound precursor into a solvent. The solvent employed is alcohols such as IPA (isopropyl alcohol) or water.

When the reaction for producing the metal compound precursor is a hydrolysis reaction, the source material therefor includes a metal alkoxide M(OR)x. When the reaction of the metal compound precursor is a complex formation reaction, the source material therefor includes a metal acetate salt, a sulfate salt, a nitrate salt, a halogen compound, and a chelating agent. For example, when the metal compound is lithium iron phosphate, the source material of the metal compound precursor is an Fe source such as iron (II) acetate, iron (II) nitrate, iron (II) chloride, or iron (II) sulfate, and a phosphoric acid source such as phosphoric acid, sodium dihydrogenphosphate, or disodium hydrogenphosphate, and a carboxylic acid such as citric acid, malic acid, or malonic acid.

A mechanochemical reaction by an Ultra-Centrifugal force processing method (hereinafter referred to as UC treatment) is favorable for the nanosizing of a carbon material. Mechanochemical reaction by UC treatment or ultrasonic wave treatment can be utilized for the adsorption of one source material of the metal compound precursor to the carbon material. Note, however, that in order to allow adsorption reaction before the nanosized carbon material reaggregates, it is favorable to perform UC treatment with respect to a mixed solution in which the carbon material and the metal compound precursor source material trying to adsorb thereto are mixed in a solvent in order to simultaneously cause nanosizing and the adsorption reaction.

The main source material that adsorbs to the carbon material by mechanochemical reaction is a titanium source, a phosphorous source such as phosphoric acid, or the like which are source materials having a positively charged ion that easily binds to an oxygen ion having an unpaired electron present in the functional group.

In this adsorption step, it is desirable that the production of the metal compound precursor is avoided as much as possible. This is because if the metal compound precursor is produced before one of the source materials of the metal compound precursor is adsorbed to the carbon material, the metal compound precursor will aggregate before it is adsorbed to the carbon material. For this reason, when the reaction for producing the metal compound precursor is a hydrolysis reaction, the solvent may be alcohols instead of distilled water so that the source material therefor has less tendency for hydrolysis or dehydration polymerization. Moreover, when the reaction for producing the metal compound precursor is a complex formation reaction, the pH may be adjusted so that the source material therefor has less tendency for complex formation.

Here, the UC treatment applies shear stress and centrifugal force to the carbon material and the metal compound precursor source material to be adsorbed thereto. This can be performed employing e.g. a reaction container shown in FIG. 2.

Figure 2:
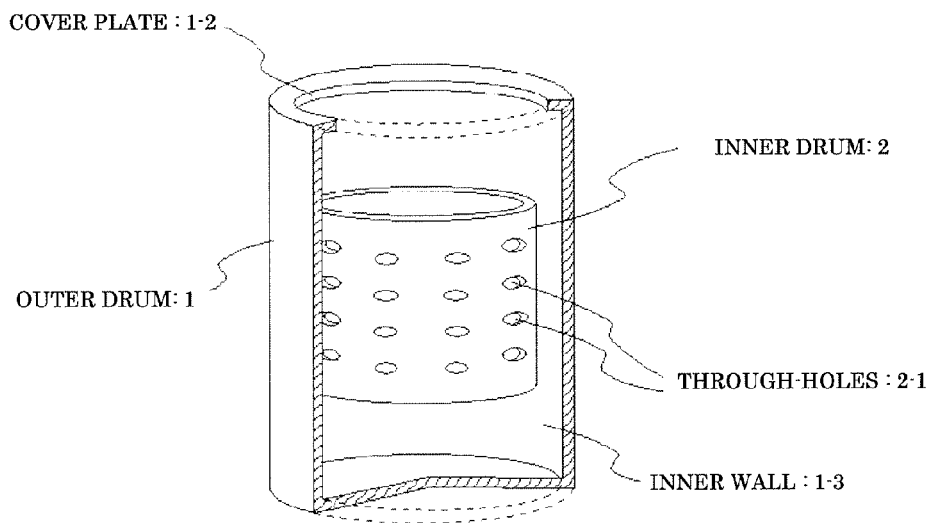
FIG. 2 is a configuration diagram that shows the device for UC treatment.

As shown in FIG. 2, the reaction container consists of an outer drum 1 having a cover plate 1-2 at the opening thereof and a rotatable inner drum 2 having through-holes 2-1. By introducing the reactant inside the inner drum 2 of this reactor and rotating the inner drum 2, the reactant inside the inner drum 2 is transferred to the inner wall 1-3 of the outer drum passing through the through-holes 2-1 of the inner drum by the centrifugal force. At this time, the reactant collides against the inner wall 1-3 of the outer drum due to the centrifugal force of the inner drum 2, and slides up to the upper portion of the inner wall 1-3 in a thin film state. In this state, the shear stress between the reactance and the inner wall 1-3 and the centrifugal force from the inner drum are both simultaneously applied to the reactant, and a large mechanical energy is thereby applied to the thin film reactant. It is though that this mechanical energy is converted into the chemical energy that is necessary for reaction, the so-called activation energy, and the reaction proceeds in a short period of time.

In this reaction, since the mechanical energy applied to the reactant will be large when in a thin film state, the thickness of the thin film is 5 mm or less, preferably 2.5 mm or less, and further preferably 1.0 mm or less. The thickness of the thin film can be set by the width of the cover plate and the amount of the reaction solution. For example, the centrifugal force necessary for producing this thin film state is 1500 N (kgms$^{-2}$) or higher, preferably 60000 N (kgms$^{-2}$) or higher, and further preferably 270000 N (kgms$^{-2}$) or higher.

(c) Precursor Production Step

A second UC treatment is carried out to mechanochemically react the source material of the metal compound precursor adsorbed to the carbon material and other source materials so as to produce a metal compound precursor on the carbon material. In other words, a second UC treatment is performed. When the reaction for producing the metal compound precursor is a hydrolysis reaction, $H_2O$ (distilled water) for hydrolysis or dehydration polymerization will be added. Moreover, when the reaction for producing the metal compound precursor is a complex formation reaction, pH will be adjusted for complex formation. For pH adjustment, e.g. an alkali such as ammonia is administered into the reaction container. In other words, the dispersion/adsorption step and the precursor production step can be separated by $H_2O$ (distilled water) or pH adjustment.

When the source material of the metal compound precursor is a metal alkoxide, hydrolysis and dehydration condensation reactions mainly occur on the carbon material by this mechanochemical reaction, and a metal compound precursor $MO_x(OH)_{x-1}$ is produced on the carbon material. When the source materials of the metal compound precursor are a metal salt and a carboxylic acid, the source material adsorbed on the carbon material and other source materials forms a complex. For example, when the adsorbed metal compound precursor source material is phosphoric acid, this phosphoric acid and an Fe source and citric acid form a complex to form a ternary complex.

In this precursor production step, since the lithium source is thought to be uninvolved in the main reaction, it may be mixed before calcination. Note, however, that it is favorably mixed together during said precursor production step because the mixing treatment of the lithium source can be simultaneously carried out by the second UC treatment.

(d) Calcination Treatment

In the calcination step, for example, a composite having a metal compound containing lithium supported on a carbon material is obtained by calcining at 700° C. for 3 minutes. Lithium nitrate, lithium hydroxide, lithium carbonate, lithium acetate, or lithium dihydrogenphosphate can be employed as the lithium source. In the calcination process, the metal compound precursor incorporates the lithium while melting, and crystallization of the metal compound proceeds.

It is desirable to rapidly heat from room temperature to 500 to 900° C. in the calcination process. It is thought that aggregation of the metal compound is prevented and nanoparticles with small particle size can be maintained by rapid heating. In rapid heating, a low oxygen concentration atmosphere having an oxygen concentration of about 1000 ppm is desirable in order to prevent oxidation of the carbon material.

(3) Characteristics of Manufactured Product

The electrode material for secondary battery fabricated by this manufacturing method has the following characteristics. In other words, the number of functional groups of the carbon material is increased to 130 to 250%, more desirably to 150% by acid treatment. The particle size of the metal compound formed from this source material is 60 to 80 nm.

The percentage of increase in the number of functional groups can be measured as follows. Phosphoric acid, that is the source material, is adsorbed to a carbon material that is not acid-treated, while the phosphoric acid, that is the source material, is also adsorbed to a carbon material that is acid-treated. The phosphoric acid remaining in each solution is then measured, and the percentage of increase in the number of functional groups can be estimated by comparing the percentage of decrease in the phosphoric acid of the tow solutions. For example, when phosphoric acid was adsorbed to the carbon material that was not acid-treated, phosphoric acid was decreased by 40%. In other words, it is thought that 40% of the phosphoric acid is adsorbed to the functional groups of the carbon material. On the other hand, there was a 60% decrease when the carbon material that was acid-treated by soaking in concentrated nitric acid for 10 minutes was employed, and it can therefore be deemed that 60% of the phosphoric acid was adsorbed functional groups which were increased to 1.5-folds.

(4) Action

Figure 3:
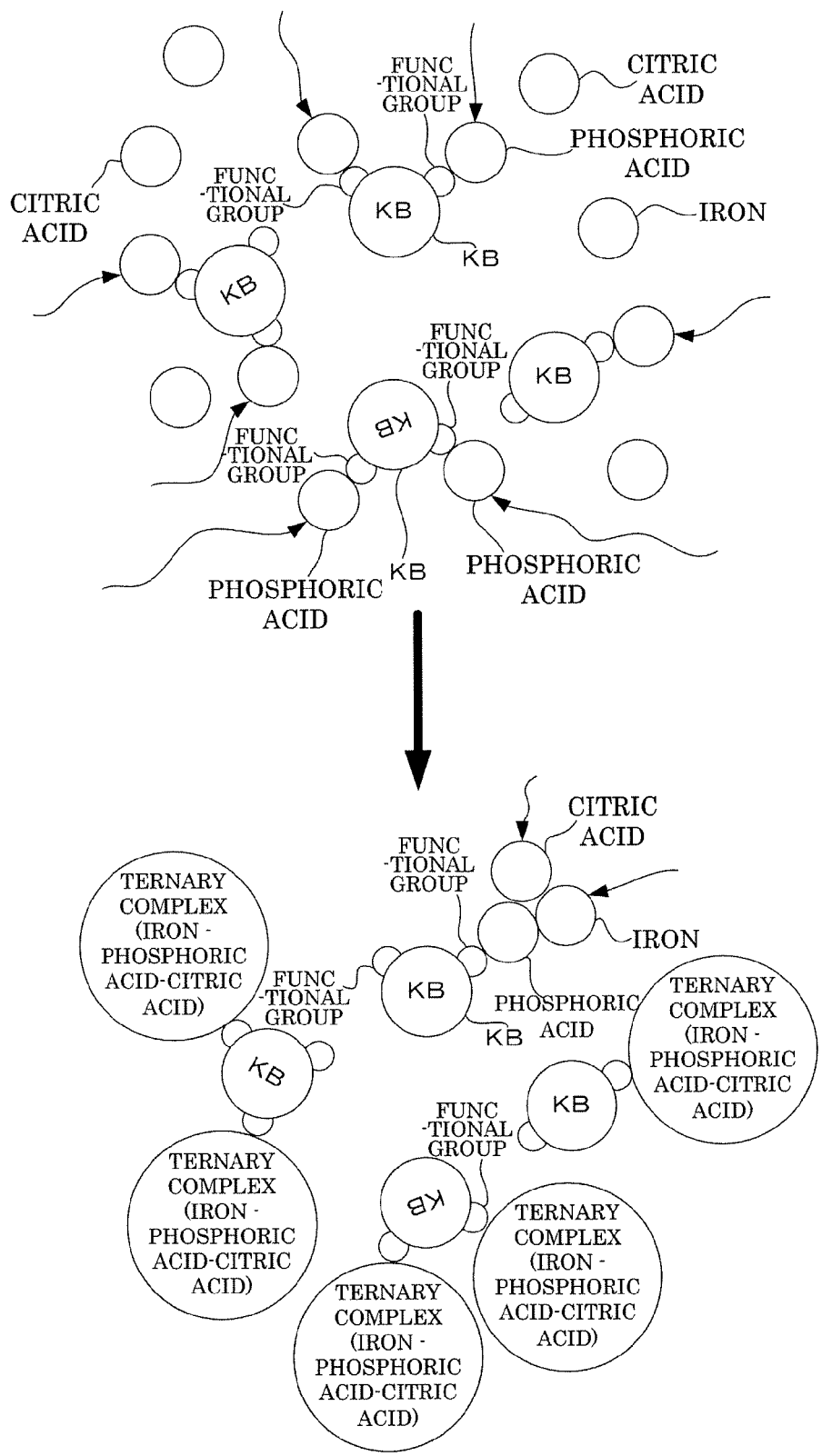
FIG. 3 is a schematic diagram that shows the adsorption process of the metal compound precursor to the carbon material according to the present embodiment.

The phenomenon that mainly contributes to the present invention produced by this manufacturing method is thought to be as follows. First, as shown in FIG. 3, the step of producing a metal compound precursor and the step of adsorbing a source material of the metal compound precursor to a carbon material are separated in the present invention, and it is thought that one source material of the metal compound is first adsorbed to the carbon material, and then the metal compound precursor is produced on the carbon material.

Then, by adsorbing the source material of the metal compound precursor to the carbon material before the precursor production treatment, it is thought that the nanosized carbon material and metal compound maintain the nanoparticle size during the compositing process without reaggregation.

Figure 7:
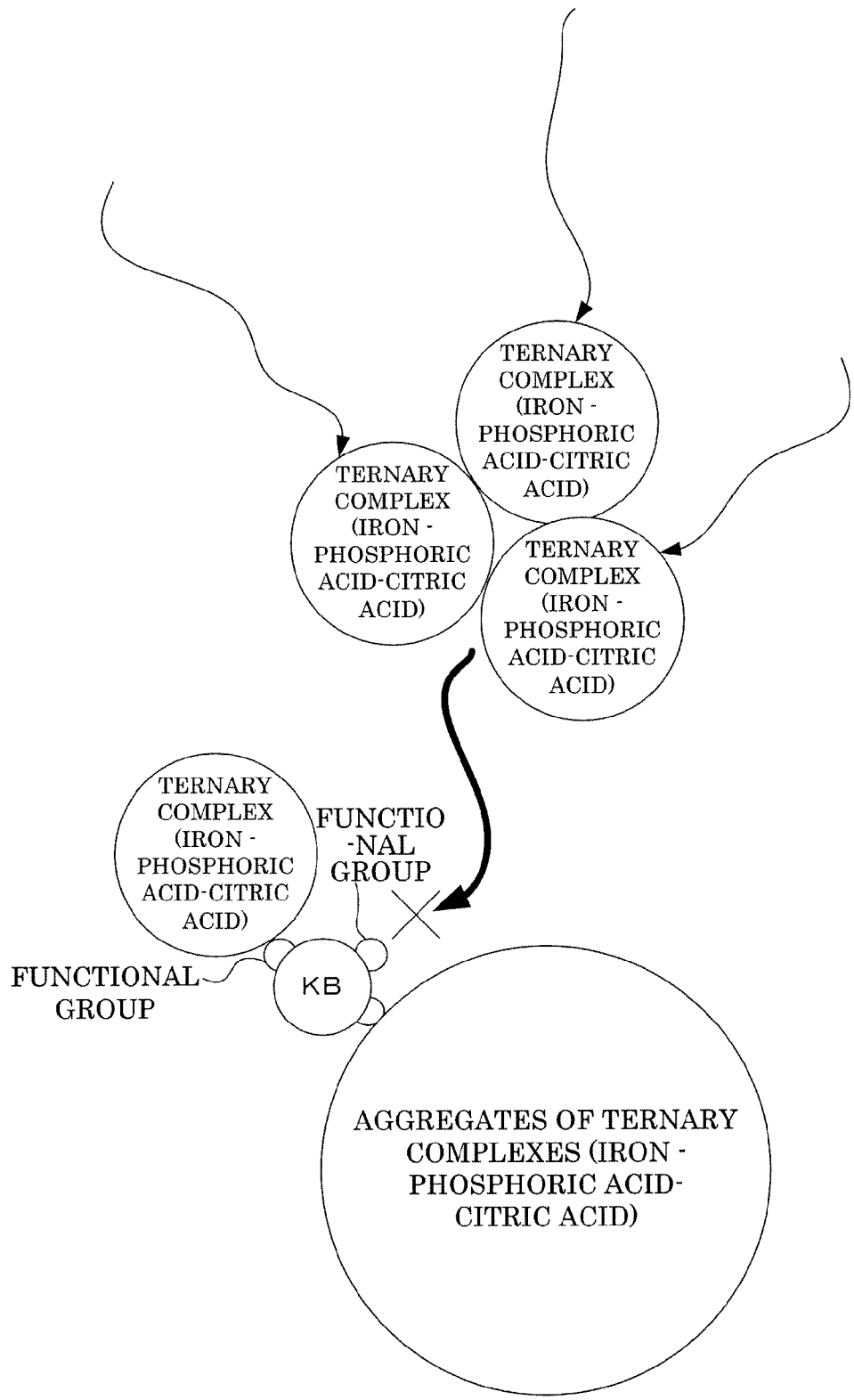
FIG. 7 is a schematic diagram that shows the adsorption process of the metal compound precursor to the carbon material according to conventional technology.

In other words, even though it was conventionally targeted to simultaneously cause the nanosizing of a carbon material, the production of a metal compound precursor, the nanosizing of the metal compound precursor, and the adsorption of the metal compound precursor to the carbon material, as shown in FIG. 7, it is thought that more than a little aggregation of the metal compound precursor was caused before adsorption, and metal compound precursors of a relatively large size had been adsorbed to the carbon material.

However, in the first dispersion/adsorption step in the present invention, mechanochemical reaction occurs under a situation where there is less tendency for the production of the metal compound precursor to occur. In this mechanochemical reaction, it is thought that many of the source materials of the metal compound with less tendency to aggregate compared to the metal compound precursor are adsorbed to the carbon material still in its small size.

For this reason, it is thought that in the precursor production step, positions where the precursors are produced are dispersed on the carbon material and the adsorbed state is retained, thereby allowing a situation where there is less tendency for aggregation even when the metal compound precursor is produced. Accordingly, the composite fabricated by this manufacturing method maintains the nanosize of the metal compound precursor.

Figure 4:
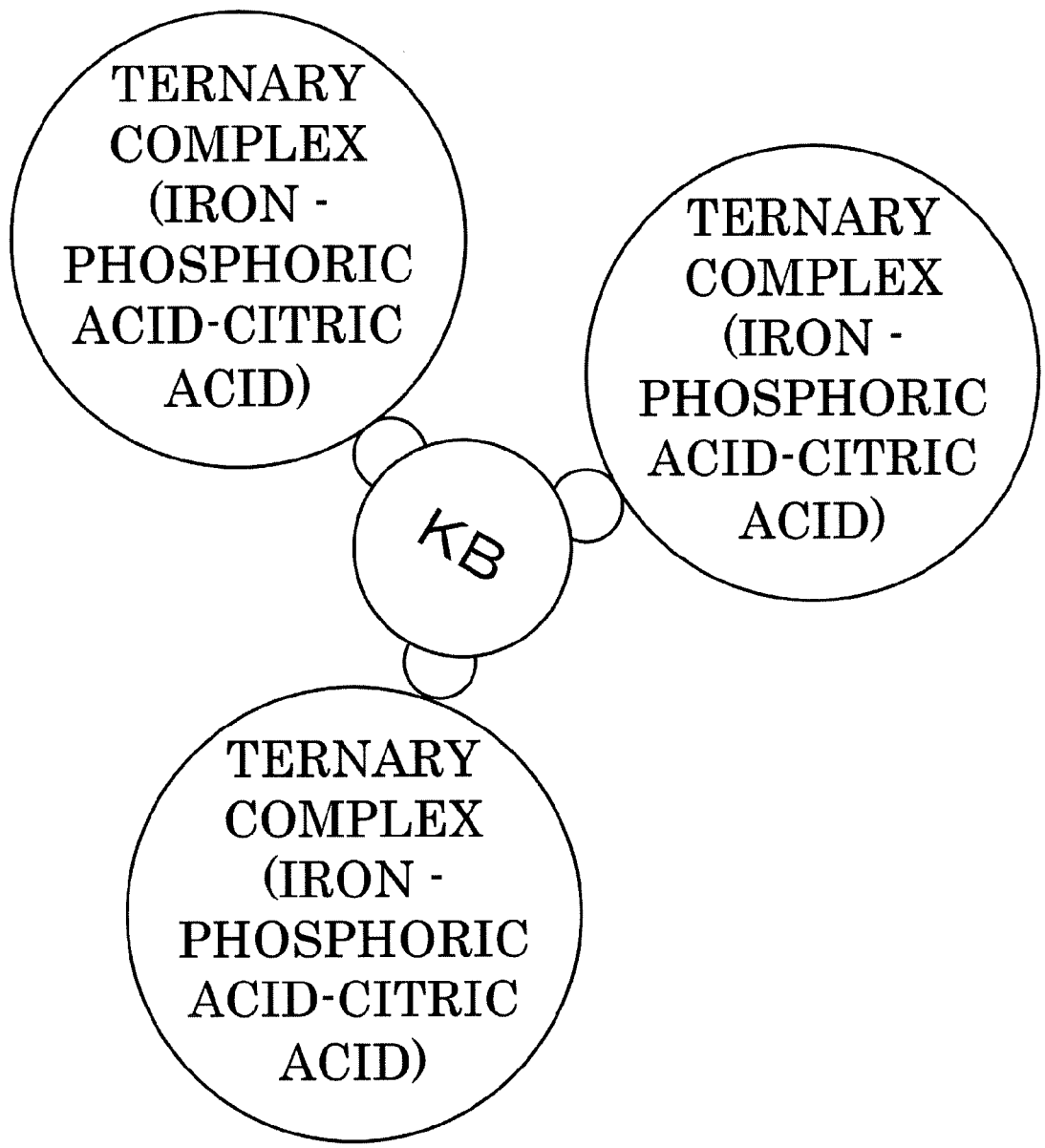
FIG. 4 is a schematic diagram that shows the adsorption state of the carbon material and the metal compound precursor according to the present embodiment.
Figure 8:
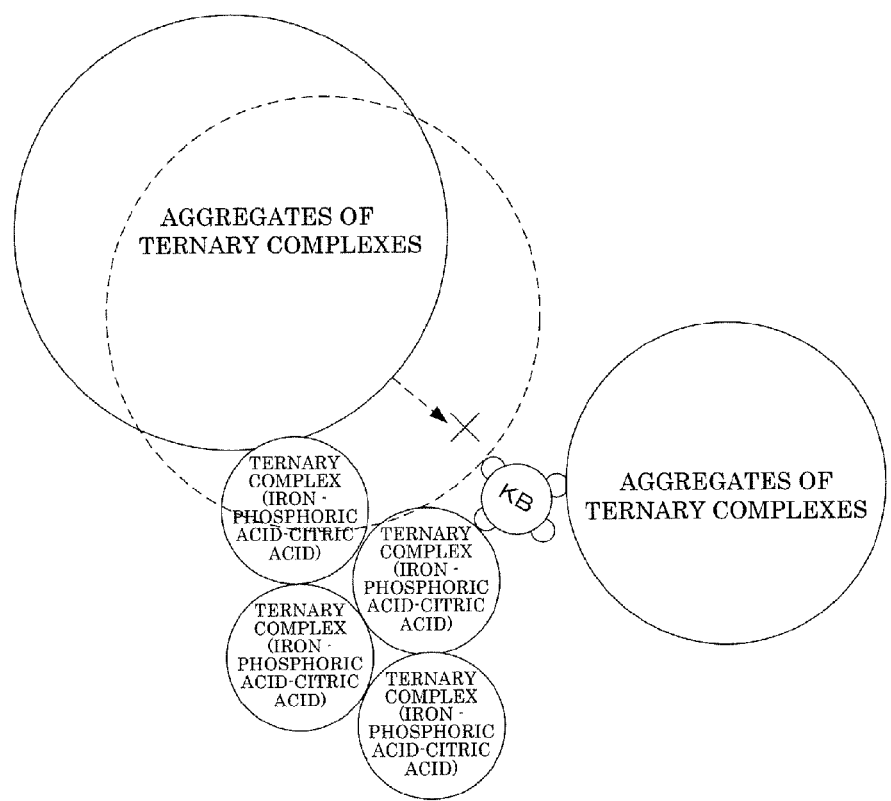
FIG. 8 is a schematic diagram that shows the adsorption state of the carbon material and the metal compound precursor according to conventional technology.

In such a case, it was conventionally thought, as shown in FIG. 8, that metal compound precursors of large size adsorbed to functional groups at one place act as a physical obstacle, thereby preventing the adsorption of other metal compound precursors to functional groups in vicinity thereof. However, in the present invention, as shown in FIG. 4, there is less tendency for such physical obstacles to occur, but rather, adsorption opportunities for the metal compound source material to the carbon material will be increased when there are more functional groups, and dispersion of the metal compound precursor on the carbon material will be promoted. For this reason, according to the present invention where the nanosize of the metal compound precursor is retained by e.g. the two UC treatments, the size of the metal compound precursor tends to become smaller with increasing number of functional groups that act as adsorption positions to the carbon material.

Accordingly, when the carbon material is acid-treated in advance of producing the metal compound precursor, for the purpose of adsorbing one type of the source materials of the metal compound precursor to the carbon material and then producing the metal compound precursor with the source material of the metal compound precursor adsorbed on the carbon material as the base point, the nanosizing of the carbon material and the metal compound in the composite is promoted, a strikingly high dispersion of these carbon material and metal compound is caused, and therefore a battery or a capacitor employing said composite as the electrode material for secondary battery will achieve high input/output and high capacitance.

(5) Examples

In order to confirm the above speculations, the properties of the electrode materials for secondary battery obtained with the present manufacturing method will be verified. In the present Examples and Comparative Examples, composites to be electrode materials were fabricated by the following conditions, and batteries employing said composites as the electrode material for secondary battery were fabricated to measure the relationship between C rate and capacitance.

Example 1

In Example 1, Ketjen Black having an average particle size of 34 nm was employed as the carbon material. This Ketjen Black was soaked in concentrated nitric acid to perform a 10-minute acid treatment. Phosphoric acid, citric acid, and iron (II) acetate were employed as the source material of the metal compound. The ratio by weight of the source material of the metal compound and the carbon material is 80:20.

Figure 5:
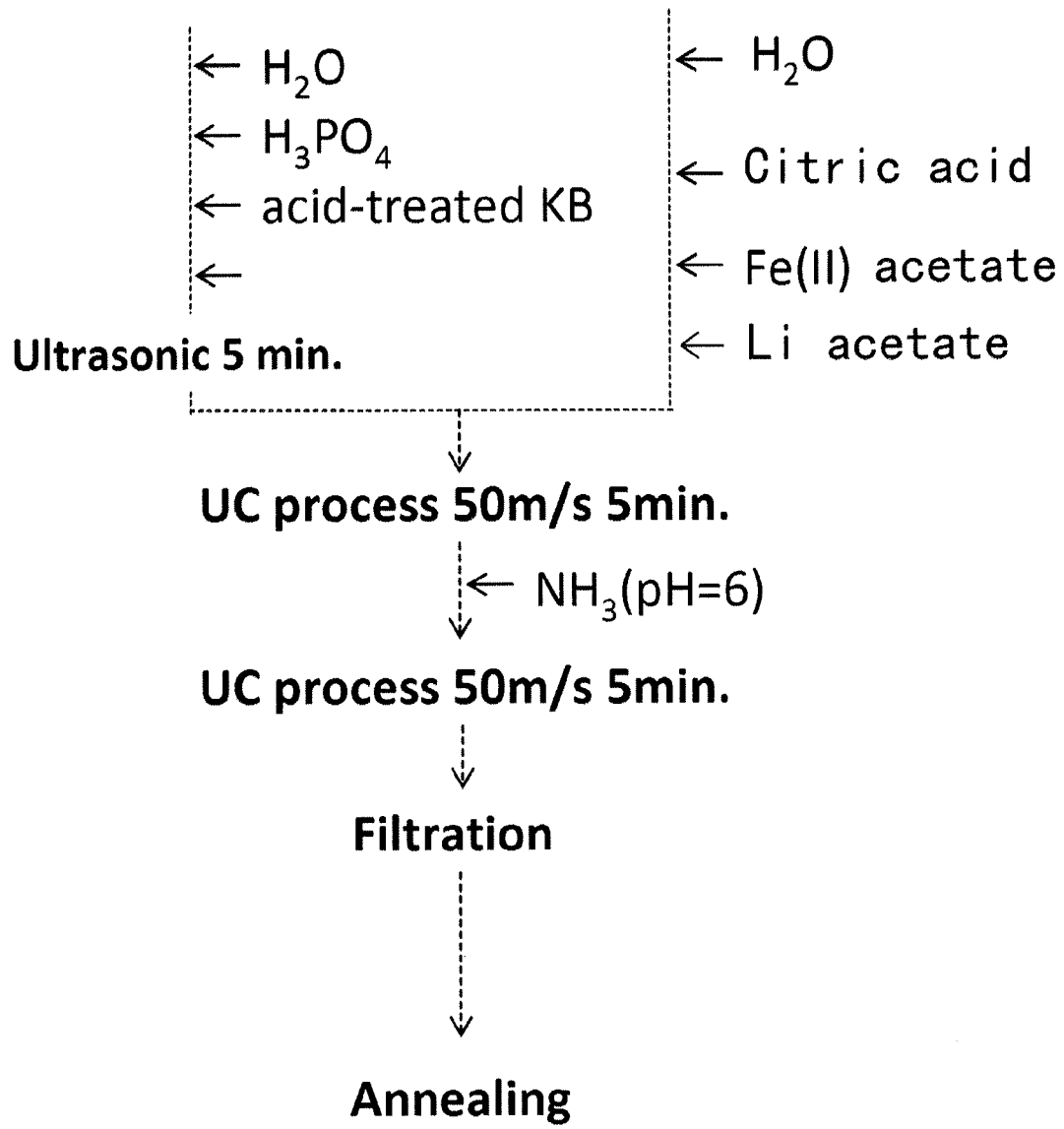
FIG. 5 is a flow chart that shows the manufacturing steps of a composite of a metal compound and a carbon material according to Example 1.

As shown in FIG. 5, Ketjen Black subjected to theacid treatment, phosphoric acid and distilled water were first mixed, and the mixed solution was subjected to 5 minutes of ultrasonic wave treatment to perform preliminary dispersion of Ketjen Black subjected to the acid treatment and pre-adsorption of phosphoric acid. This preliminary dispersion should allow for easier nanosizing of Ketjen Black in the next UC treatment step, and this pre-adsorption should allow many phosphoric acids to be adsorbed to Ketjen Black having many functional groups formed.

A mixed solution of iron (II) acetate, citric acid, lithium acetate, and distilled water was added to the mixed solution subjected to the ultrasonic wave treatment, and UC treatment at a rotation speed of 50 m/s for 5 minutes was performed. In this UC treatment, a centrifugal force of 66000 N (kgms$^{-2}$) is applied. This first UC treatment corresponds to the nanosizing of Ketjen Black having many functional groups formed and the adsorption treatment of phosphoric acid.

Next, the mixed solution inside the container was adjusted to pH=6 by adding ammonia, and UC treatment at a rotation speed of 50 m/s for 5 minutes was performed. This second UC treatment is equivalent to the complex formation treatment of phosphoric acid and iron (II) acetate and citric acid adsorbed to Ketjen Black particles, and corresponds to the metal compound precursor production treatment on Ketjen Black particles.

Then, after drying the obtained solution in vacuum at 80° C. for 17 hours, crystallization of lithium iron phosphate was allowed to proceed by rapid heating in a nitrogen atmosphere to 700° C. to obtain a composite powder of nanoparticulate lithium iron phosphate supported on Ketjen Black.

This composite powder was introduced into an SUS mesh welded onto an SUS plate with polyvinylidene fluoride PVDF as a binder (LiFePO$_4$/KB/PVDF 80:20:5) to yield a working electrode W.E. A separator and a counter electrode C.E. as well as an Li foil as a reference electrode were placed on said electrode, impregnated with 1.0M lithium hexafluorophosphate (LiPF$_6$)/ethylene carbonate (EC):dimethyl carbonate (DEC) (1:1 w/w) as the electrolytic solution to yield a cell. In this state, the charge and discharge properties thereof were investigated with working voltage at 2.5 to 4.2 V.

Comparative Example 1

In Comparative Example 1, acid treatment was performed on Ketjen Black but UC treatment was cut back to only once. In other words, all the source materials were simultaneously mixed and subjected to only one UC treatment to target simultaneously causing the nanosizing of Ketjen Black, the production of a ternary complex of iron and phosphoric acid and citric acid, the nanosizing of said ternary complex, and the adsorption of said ternary complex to Ketjen Black. UC treatment conditions are the same as Example 1.

Comparative Example 2

In Comparative Example 2, UC treatment was performed twice at the same timings as the Example, but acid treatment was not performed on Ketjen Black.
(Results)

The following measurements were performed with the functional groups of Ketjen Black. In Example 1 and Comparative Examples 1 and 2, the phosphoric acid concentration in the reaction solution after UC treatment of Ketjen Black and the source material was quantified by ion chromatography. The phosphoric acid was reduced by 60% in Example 1 and Comparative Example 1, and reduced by 40% in Comparative Example 2. From this, the number of functional groups of Ketjen Black in Example 1 was thought to have increased to 1.5-fold.

Moreover, the particle size of the aggregated particles of Ketjen Black and lithium iron phosphate in the composites obtained by the manufacturing methods of Example 1 and Comparative Examples 1 and 2 were measured by SEM observation. As a result, the particle size of lithium iron phosphate was distributed from 60 nm to 80 nm with an average of 70 nm for Example 1, 100 nm for Comparative Example 1, and 200 nm for Comparative Example 2. The particle size of Ketjen Black was all 34 nm in Example 1 and Comparative Examples 1 and 2.

From this result, the particle size of lithium iron phosphate was the smallest for Example 1 where acid treatment was performed on Ketjen Black for the purpose of adsorbing phosphoric acid to Ketjen Black and producing a ternary complex of iron and phosphoric acid and citric acid on Ketjen Black. Comparative Examples 1 and 2 where said adsorbing tereatment and acid treatment were not combined had larger particle size of lithium iron phosphate compared to Example 1.

Figure 6:
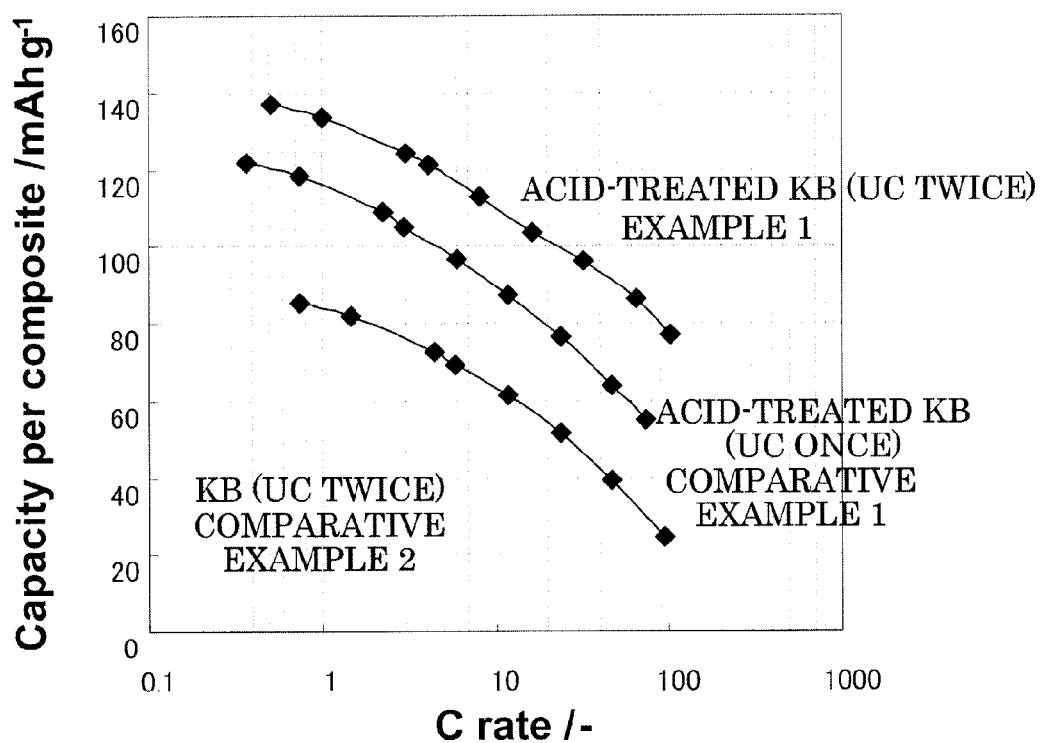
FIG. 6 is a graph that shows the relationship between capacitance and C rate in Example 1 and Comparative Examples 1 and 2.

Moreover, as shown in FIG. 6, a battery that employs the composite powder fabricated in Example 1 had a capacitance of 140 mAh/g$^{-1}$ when C rate was 1 C, and high capacitance is achieved compared to 118 mAh/g$^{-1}$ for Comparative Example 1 and 85 mAh/g$^{-1}$ for Comparative Example 2. Further, a battery that employs the composite powder fabricated in Example 1 had a capacitance of 85 mAh/g$^{-1}$ when C rate was 100 C, and it can be said that high capacitance is maintained and high input/output is possessed even with higher C rate compared to 55 mAh/g$^{-1}$ for Comparative Example 1 and 30 mAh/g$^{-1}$ for Comparative Example 2.

It is thought that Comparative Example 1 could not yield a good composite because some aggregation had developed during the time until the ternary complex was adsorbed to Ketjen Black, thus causing the particle size to be that much larger, and many functional groups not involved in adsorption were produced due to the size growth of particles. Moreover, it is thought that since there are fewer functional groups in Comparative Example 2 compared to Example 1, some of the opportunities for phosphoric acid to adsorb to Ketjen Black were lost, thus causing that much aggregation.

On the other hand, in the present invention with Example 1 as one example, a treatment of increasing the functional groups possessed by a carbon material was performed in advance, a metal compound precursor was supported on a carbon material by dividing into a treatment to adsorb one of source materials of the metal compound to said functional groups of the carbon material having increased functional groups and a treatment of reacting the adsorbed source material of the metal compound with the rest of the source materials on the carbon material to produce a metal compound precursor on the carbon material, and a lithium source was introduced and calcined. By doing so, the nanosize of the carbon material and the metal compound is maintained until the end, and large capacitance and high input/output can be realized.

DESCRIPTION OF SYMBOLS

1: Outer drum
1-2: Cover plate
1-3: Inner wall
2: Inner drum
2-1: Through-holes

The invention claimed is:

1. A method for manufacturing an electrode material by compositing a metal compound and a carbon material, the method comprising the following steps:

a first step increasing functional groups possessed by the carbon material;

a second step adsorbing one source material of the metal compound to the functional groups of the carbon material having increased the functional groups by mechanochemical reaction by applying shear stress and centrifugal force to a solution comprising the carbon material and the one source material of the metal compound, a third step reacting the source material of the metal compound that is adsorbed with at least one other source material of the metal compound on the carbon material by mechanochemical reaction by applying shear stress and centrifugal force to a solution comprising the source material of the metal compound that is adsorbed and the at least one other source material of the metal compound to produce a metal compound precursor on the carbon material; and a fourth step calcining a product obtained in the third step, wherein the above respective steps are performed separately.

2. The method for manufacturing an electrode material according to claim 1, wherein the carbon material is acid-treated in the first step increasing the functional groups.

3. The method for manufacturing an electrode material according to claim 1, wherein the second and third steps are treatments allowing mechanochemical reaction by applying shear stress and centrifugal force respectively to a solution comprising the carbon material and the source materials of the metal compound inside a rotating reaction container.

4. The method for manufacturing an electrode material according to claim 1, further comprising a step adsorbing one of the source materials of the metal compound to the said carbon material by ultrasonic wave treatment.

5. The method for manufacturing an electrode material according to claim 2, wherein the second and third steps are treatments allowing mechanochemical reaction by applying shear stress and centrifugal force respectively to a solution comprising the carbon material and the source materials of the metal compound inside a rotating reaction container.

6. The method for manufacturing an electrode material according to claim 2, further comprising a step adsorbing one of the source materials of the metal compound to the said carbon material by ultrasonic wave treatment.

7. The method for manufacturing an electrode material according to claim 3, further comprising a step adsorbing one of the source materials of the metal compound to the said carbon material by ultrasonic wave treatment.

8. The method for manufacturing an electrode material according to claim 5, further comprising a step adsorbing one of the source materials of the metal compound to the said carbon material by ultrasonic wave treatment.

* * * * *